Patented Mar. 9, 1954

2,671,793

UNITED STATES PATENT OFFICE 2,671,793

17 ALPHA-HYDROXY ALLOPREGNANE-DIONES AND PROCESS

George Rosenkranz, Stephen Kaufmann, and John Pataki, Mexico City, Mexico, assignors to Syntex, S. A., Mexico City, Mexico, a corporation of Mexico No Drawing. Application September 19, 1949, Serial No. 116,624

8 Claims. (Cl. 260—397.4)

The present invention relates to new cyclopentanophenanthrene derivatives and process for producing the same. More particularly, the present invention relates to new allopregnane derivatives and to a novel process for preparing these derivatives. The new compounds, with which this present invention is particularly concerned, are derivatives of allopregnane having a hydroxy group at the 17α position. Compounds of this character are especially suitable as therapeutics and/or intermediates for the production of therapeutically useful products.

The starting material for the production of the aforesaid derivatives is the known compound allopregnane-3β,17α-diol-20-one. It has been found, in accordance with the present invention, that when the aforesaid compound is treated with a mol quantity of bromoacetamide in the presence of a weak organic base, such as pyridine, an oxidation of the hydroxyl group in position 3 takes place with the production of allopregnane-17α-ol-3,20-dione.

It has been further found that upon treatment of the allopregnane-17α-ol-3,20-dione with 1 mol of bromine a new compound 2-bromo-allopregnane-17α-ol-3,20-dione is produced. Thereafter, upon dehydrobromination the unsaturated or $\Delta^{1,2}$ corresponding derivative is produced, i. e. $\Delta^{1,2}$-allopregnene-17α-ol-3,20-dione. Although bromoacetamide in the presence of pyridine is the preferred oxidizing agent for the production of the 3 keto compound previously described, other brominated or chlorinated amides, both aliphatic and aromatic, may be used, such as bromotoluenesulfonamide, bromophthalimide, bromosuccinimide or chlorosuccinimide.

In other words, the amides which may be used in the first step of the present reaction may be exemplified by the following formula:

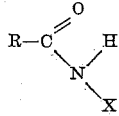

wherein R is an aromatic or aliphatic radical and X is selected from the group consisting of bromine or chlorine. In place of pyridine, which is preferred for the present reaction, other weak organic bases may be used, as for example, collidine, lutidine or diethyl aniline. For the dehydrobromination step of the present process the use of collidine is preferred. However, in place of collidine, pyridine, lutidine, or diethyl aniline may be used.

In general, for the first step of the present process the allopregnane-3β-17α-diol-20-one may be dissolved in a suitable solvent, such as tertiary butyl alcohol and a small amount of pyridine together with 1 mol of bromoacetamide are added for each mol of the allopregnane compound. The solution is allowed to stand for a prolonged period of the order of one day at room temperature and thereafter concentrated in vacuo. The concentrate may then be diluted with water and the precipitate filtered and washed with water. Thereafter the precipitated diketone may be recrystallized from ethanol. For the bromination step the diketone is preferably dissolved in glacial acetic acid and treated with a molar quantity of bromine for each mol of diketone in the presence of a few drops of concentrated hydrobromic acid. In the alternative the diketone may be treated with chlorine to produce the corresponding chloro compound. The reaction mixture produced after a short period of time, as for example ten minutes, is then poured into water and the precipitate filtered and washed with water. The bromo-ketone thus produced may be also recrystallized as from ethanol. The dehydrobromination of the bromo-ketone compound, as previously set forth is preferably performed by the use of collidine. Preferably the compound is refluxed with the collidine for a period of time of the order of 15 minutes. The reaction mixture is then cooled, treated with ethyl acetate and washed with a dilute mineral acid, as for example sulfuric acid, and then with water to neutrality. The solution is then dried and concentrated until crystallization begins. It is then cooled and the $\Delta^{1,2}$ compound is then filtered and recrystallized from ethyl acetate.

The foregoing reactions may be exemplified by the following equation:

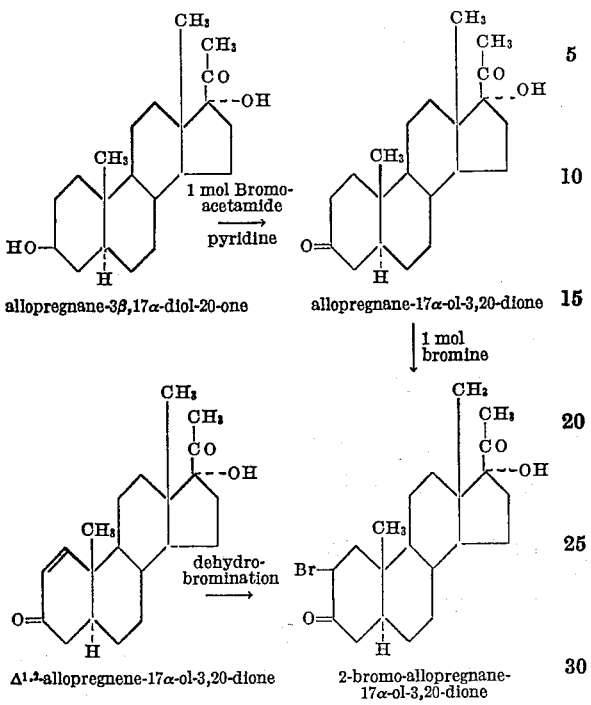

allopregnane-3β,17α-diol-20-one     allopregnane-17α-ol-3,20-dione

Δ¹,²-allopregnene-17α-ol-3,20-dione     2-bromo-allopregnane-17α-ol-3,20-dione

The following specific examples serve to illustrate the present invention but are not intended to limit the same:

Example I 10 g. of allopregnane-3β,17α-diol-20-one were dissolved in 1500 cc. of tertiary butyl alcohol and 15 cc. of pyridine and 5.9 g. of N-bromoacetamide were added. After standing for 20 hours at room temperature the solution was concentrated in vacuo. The concentrate was diluted with 2000 cc. of water, the precipitate filtered and washed with water. The washed precipitate was recrystallized from ethanol and the allopregnane-17α-ol-3,20-dione thus produced melted at 250–252° C.

Example II

A solution of 13.4 g. of allopregnane-17α-ol-3,20-dione of Example I in 1340 cc. of glacial acetic acid, containing a few drops of concentrated hydrobromic acid, was treated with 6.8 g. of bromine dissolved in 136 cc. of glacial acetic acid. After 10 minutes the reaction mixture was poured into 4000 cc. of water and the precipitate filtered and washed thoroughly with water. The washed precipitate was recrystallized from ethanol and the 2-bromo-allopregnane-17α-ol-3,20-dione thus produced melted at 188–199° C. with decomposition.

Example III 10 g. of 2 - bromo - allopregnane - 17α - ol-3,20-dione of Example II were refluxed with 40 cc. of collidine for 15 minutes. The reaction mixture was cooled to room temperature and ethyl acetate was added. The solution was washed first with dilute sulfuric acid and then with water until neutral, dried and concentrated until crystallization began. After cooling, the Δ¹,²-allopregnene-17α-ol-3,20-dione was filtered and recrystallized several times from ethyl acetate. It was found to have a melting point of 254–257° C.

It will be obvious to those skilled in the art that various changes may be made without departing from the spirit of the invention and therefore the invention is not limited to what is described in the specification but only as indicated in the appended claims.

What is claimed is:

1. Allopregnane - 17α - ol - 3,20 - dione having a melting point of 250–252° C.

2. 2 - halo - allopregnane - 17α - ol - 3,20-dione having the following formula:

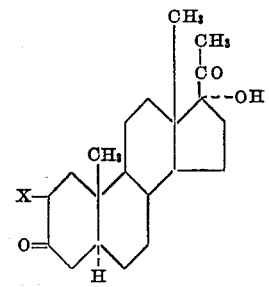

wherein X is a halogen selected from the group consisting of bromine and chlorine.

3. 2 - bromo - allopregnane - 17α - ol - 3,20-dione having a melting point of 188–191° C.

4. Δ¹,² - allopregnene - 17α - ol - 3,20 - dione having a melting point of 254–257° C.

5. A process for the production of Δ¹,²-allopregnene - 17α - ol - 3,20 - dione comprising treating allopregnane - 3β,17α - diol - 20 - one with one mol of a compound of the formula:

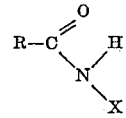

wherein R is selected from the group consisting of aromatic and aliphatic radicals and X is selected from the group consisting of bromine and chlorine in the presence of a weak organic base to produce allopregnane-17α-ol-3,20-dione, brominating allopregnane-17α-ol-3,20-dione to produce 2 - bromo - allopregnane - 17α - ol - 3,20-dione and subjecting 2-bromo-allopregnane-17α-ol-3,20-dione to dehydrobromination.

6. A process for the production of Δ¹,²-allopregnene - 17α - ol - 3,20 - dione comprising treating allopregnane - 3β,17α - diol - 20 - one with one mol of bromoacetamide in the presence of pyridine to produce allopregnane-17α-ol-3,20-dione, brominating allopregnane - 17α - ol - 3,20-dione to produce 2 - bromo - allopregnane - 17α-ol-3,20-dione and treating 2-bromo-allopregnane-17α-ol-3,20-dione with collidine.

7. A process for the production of allopregnane-17α-ol-3,20-dione comprising treating allopregnane-3β,17α-diol-20-one with one mol of a compound of the formula:

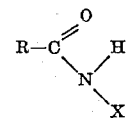

wherein R is selected from the group consisting of aromatic and aliphatic radicals and X is selected from the group consisting of bromine and chlorine in the presence of a weak organic base to produce allopregnane-17α-ol-3,20-dione.

8. A process for the production of allopregnane-17α-ol-3,20-dione comprising treating allopregnane-3β,17α-diol-20-one with one mol of bromoacetamide in the presence of pyridine to produce allopregnane-17α-ol-3,20-dione.

GEORGE ROSENKRANZ.
STEPHEN KAUFMANN.
JOHN PATAKI.

References Cited in the file of this patent

UNITED STATES PATENTS

| Number | Name | Date |
|---|---|---|
| 2,260,328 | Miescher | Oct. 28, 1941 |
| 2,305,602 | Butenandt | Dec. 22, 1942 |
| 2,312,481 | Reichstein | Mar. 2, 1943 |
| 2,401,775 | Reichstein | June 11, 1946 |

FOREIGN PATENTS

| Number | Country | Date |
|---|---|---|
| 536,621 | Great Britain | May 21, 1941 |

OTHER REFERENCES

Butenandt et al., Berichte 68, 1854–1859 (1935).